United States Patent Office 3,248,459
Patented Apr. 26, 1966

3,248,459
THIOL-PHOSPHORIC, -PHOSPHONIC, -PHOSPHINIC OR THIONOTHIOL-PHOSPHORIC, -PHOSPHON-IC, -PHOSPHINIC ACID ESTERS AND PROCESSES FOR THE PRODUCTION THEREOF
Walter Lorenz, Wuppertal-Vohwinkel, Germany, assignor to Farbenfabriken Bayer Aktiengesellschaft, Leverkusen, Germany, a German corporation
No Drawing. Filed Nov. 23, 1962, Ser. No. 239,775
Claims priority, application Germany, Nov. 24, 1961, F 35,409
6 Claims. (Cl. 260—940)

The present invention relates to and has as its object new and useful insecticidally active thiol-phosphoric, -phosphonic, -phosphinic or thionothiol-phosphoric, -phosphonic, -phosphinic acid esters and processes for their production. More specifically this invention is concerned with compounds of the formula

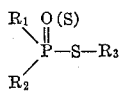

wherein $R_1$ and $R_2$ denote the same or different alkyl or alkoxy residues, whilst $R_3$ represents an optionally substituted aryl or heterocyclic radical as well as processes for the production thereof.

The German patent specification 818,352 already describes a process for the production of neutral esters of thiophosphoric acids, which is characterised in that alkyl thiocyanates, optionally substituted in the alkyl residue, are allowed to act on alkali metal salts of dialkyl phosphites. In addition, it is known from German patent specifications 946,056 and 954,415 that the above mentioned reaction can also be extended to special representatives of the group of alkyl thiocyanates, in fact the carbalkoxyalkyl- and 1,2-dicarbalkoxyethyl- and also N,N-dialkylaminoalkyl-thiocyanates which may also be further substituted.

The object of German patent specification 947,367 is a modification of the first stated process which consists in mixing dimethyl phosphite with an aliphatic thiocyanate and reacting the resultant mixture with the required amount of an alkali metal in the presence of an inert solvent.

Finally, German patent specification 1,087,591 describes a process for the production of dithiophosphoric acid esters by the reaction of optionally substituted alkyl or aralkyl thiocyanates with O,O-dialkyl-thiolphosphites in the presence of alkali metal alcoholates.

In accordance with the present invention it has now been found that aromatic and heterocyclic thiocyanates can also be condensed with O,O-dialkyl-(thio)-phosphites, alkyl - O - alkyl - (thio)-phosphonites, or dialkyl-(thio)-phosphinites in the presence of substances having a basic reaction, such as alkali metal alcoholates or tertiary amines, to form the corresponding thiol- or thionothiol-phosphoric (-phosphonic, -phosphinic) acid esters of the formula as given above.

The process according to the present invention may be explained by the example of the reaction of O,O-diethyl phosphite with phenyl isothiocyanate in the presence of sodium ethylate:

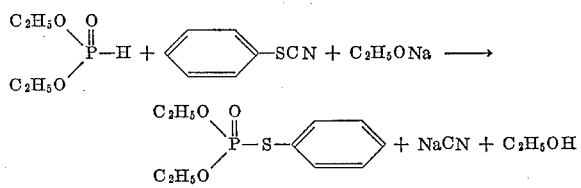

As starting materials for the process according to the invention, there may especially be taken into consideration those aromatic or heterocyclic thiocyanates which, in addition to the thiocyanate group, also contain other substituents in the aryl residue or in the heterocyclic ring such as, for example, amino, alkylamino, dialkylamino, N-oxy di-alkylamino, sulphonylamino, acylamino, nitro, cyano, hydroxy, alkoxy, carbalkoxy, and/or alkyl groups. Thiocyanates substituted in this way are compounds which can nowadays be very readily prepared.

In contrast, the thiol- or thionothiol-phosphoric (-onic, -inic) acid esters readily obtainable according to the inventive process in good yields could not hitherto be prepared at all by other methods, since the aromatic or heterocyclic mercaptans required as starting materials for the previously known processes are not available or only with great difficulty owing to their ready capacity for oxidation.

The course of the reaction according to the present process was surprising insofar as it could not be foreseen that the cyano residue of aromatic and heterocyclic thiocyanates could be readily exchanged for the residue of a thiol- or thionothiol-phosphoric (-onic, -inic) acid in an alkaline medium in such a smooth way and without occurrence of side reactions, because it is known from the literature, that thiocyanates do not react with basic reactants according to a specific reaction mechanism, since disulphide mercaptans are formed in addition to larger or smaller amounts of secondary products (cf. in this respect: Houben-Weyl, "Methoden der organischen Chemie," 4th edition, vol. 9, p. 69, and also J. A. C. McClelland and S. Smiles, "Journal of the Chemical Society," 1933, p. 786). In comparison, the reaction according to the present process proceeds already at temperatures between 0 and +20° C. rapidly and without any formation of secondary products.

The use of solvents is appropriate for carrying out the process according to the invention. For this purpose, there have proved suitable, in particular, hydrocarbons such as benzene, chlorobenzene, toluene, xylene, and the like, or also lower aliphatic alcohols such as methanol or ethanol. Furthermore, it is sometimes necessary to cool the reaction mixture somewhat during the reaction since the reaction usually proceeds exothermally.

The thiol- or thionothiol-phosphoric (-onic, -inic) acid esters obtainable according to the present invention often constitute solid crystalline substances, which can readily be further purified by recrystallisation from the usual solvents; however, sometimes the products of the process are obtained in the form of distillable oils.

The inventive preparations are characterised by excellent insecticidal properties, and are therefore intended for their application as pest control agents or plant protecting agents.

The new compounds of the present invention very effectively kill insects like aphids, spider mites, caterpillars, flies etc. They distinguish themselves especially by a good contact-insecticidal activity and mostly also by a systemic action. At the same time they have an activity on eating insects such as caterpillars. Most surprisingly they are of remarkably low toxicity against warmblooded animals. They may be used in the same manner as other known phosphoric insecticides, i.e., in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae (I) 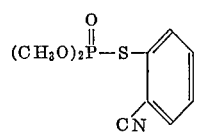

(II) 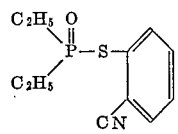

(III) 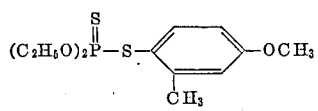

have been tested against aphids (Compounds I and II) caterpillars (Compounds II and III) and flies (Compounds I and III). Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs. The tests have been carried out as follows:

(a) Against aphids (species *Doralis fabae*): heavily infested bean plants (*Vicia faba*) have been sprayed drip wet with solutions as prepared above. The effect has been determined after 24 hours by counting the dead pests either on the surface of the soil or still reamining on the plants. The following results have been obtained:

| Compound | Aqueous concentration (in percent active ingredient/water) | Killing rate (in percent) |
|---|---|---|
| (I) | 0.001 | 100 |
| (II) | 0.01 | 100 |

(b) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate (in percent) |
|---|---|---|
| (II) | 0.001 | 100 |
| (III) | 0.1 | 100 |

(c) Against flies: about 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound | Aqueous concentration (in percent active ingredient/water) | Killing rate (in percent) |
|---|---|---|
| (III) | 0.001 | 100 |
| (III) | 0.01 | 100 |

The following examples provide a survey over the invention as claimed.

Example 1

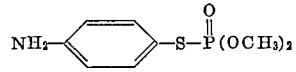

The amount of a solution of sodium methylate corresponding to 0.28 mol of sodium is added dropwise at 20° C., with external cooling, to a solution of 37.5 g. (0.25 mol) of 4-aminophenyl thiocyanate and 37 g. (0.33 mol) of O,O-dimethylphosphorous acid ester in 150 cc. of benzene. The mixture is subsequently stirred at room temperature for half an hour, thereafter washed with water until the reaction is neutral, dried over sodium sulphate, and the solvent is finally distilled off in vacuo. The residual oil is boiled thoroughly with ether, when small amounts of a brown residue separate. The O,O-dimethyl-S-(4-aminophenyl-)thiolphosphoric acid ester crystallises from the ether solution as colourless needles of M.P. 64° C. The yield amounts to 46 g. (79% of the theoretical).

*Analysis.*—Calc. for $C_8H_{12}O_3NSP$ (mol. weight 233.2): N, 6.01%; P, 13.28%. Found: N, 6.09%; P, 13.22%.

The mean toxicity of the compound ($LD_{50}$) when administered orally on the rat amounts to 250 to 500 mg. per kg. of animal. Mosquito larvae are completely killed by 0.001% solution of the ester.

Example 2

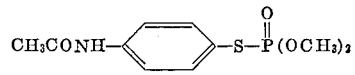

48 g. (0.25 mol) of 4-acetamidophenyl thiocyanate (M.P. 188° C.) and 37 g. (0.33 mol) of O,O-dimethyl-phosphorous acid ester are dissolved in 150 cc. of benzene. The amount of a solution of sodium methylate, corresponding to 0.28 mol of sodium, is added dropwise at 10 to 20° C., to this solution with external cooling, the reaction mixture is stirred at 20° C. for another half hour, and then poured into water. The separated oil is dissolved in benzene with the aid of a little methylene chloride, the benzene solution is washed with water until the reaction is neutral, and dried over sodium sulphate. When the solvent has been distilled off, the residual oil rapidly solidifies as crystals. On recrystallisation from benzene, the O,O-dimethyl - S - (4 - acetamidophenyl-) thiolphosphoric acid ester is obtained in the form of colourless crystals, M.P. 104° C. Yield: 55 g. (80% of the theoretical amount).

*Analysis.*—Calc. for $C_{10}H_{14}O_4NSP$ (mol. weight 275.3): N, 5.09%; S, 11.65%; P, 11.25%. Found: N, 5.08%; S, 12.21%; P, 11.41%.

The mean toxicity of the compound when administered orally on the rat amounts to 100 to 250 mg. per kg. of animal.

Example 3

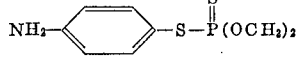

37.5 g. (0.25 mol) of 4-aminophenyl thiocyanate and 38 g. (0.3 mol) of O,O-dimethylthiophosphorous acid ester are dissolved in 150 cc. of benzene, the amount of a solution of sodium methylate, corresponding to 0.28 mol of sodium, is added dropwise to this solution at 20° C., with external cooling, and the reaction mixture is then stirred at room temperature for half an hour. The benzene solution is subsequently washed with water until it reacts neutral, and dried over sodium sulphate. When the solvent has been distilled off, the residual oil solidifies as crystals. On recrystallisation from an ether/petroleum ether mixture, the O,O-dimethyl-S-(4-aminophenyl-) thionothiolphosphoric acid ester is obtained in the form of colourless crystals with M.P. 79° C. The yield amounts to 54 g. (86.8% of the theoretical).

Analysis.—Calc. for $C_8H_{12}O_2NS_2P$ (mol. weight 249.3): N, 5.37%; S, 25.72%. Found: N, 5.61%; S, 25.19%.

The mean toxicity ($LD_{50}$) of the compound amounts to 1000 mg. per kg. of rat on oral administration.

The systemic action of 0.1% solutions of the ester against aphids is 100%.

*Example 4*

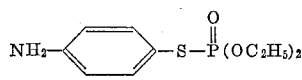

The amount of a solution of sodium methylate, corresponding to 0.28 mol of sodium, is added dropwise, with cooling, to a solution of 37.5 g. (0.25 mol) of 4-aminophenyl thiocyanate and 46.5 g. (0.33 mol) of O,O-diethylphosphorous acid ester in 150 cc. of benzene, when the temperature of the mixture may not exceed 20° C. After 13 minutes, the reaction mixture is treated with sufficient dilute hydrochloric acid to give it a neutral reaction (pH value 7), and the benzene solution is subsequently dried over sodium sulphate. When the solvent has been distilled off, a yellow oil remains. The latter is suspended in water and dissolved with the aid of dilute hydrochloric acid. Small amounts of undissolved greases are filtered off with suction. The reaction mixture in hydrochloric acid is then neutralised with sodium bicarbonate and the separated oil is taken up in benzene. After the benzene solution has been dried over sodium suphate and the solvent has been distilled off, 57 g. (87.8% of theoretical yield) of O,O-diethyl-S-(4-aminophenyl-) thiolphosphoric acid ester are obtained in the form of a yellow viscous oil.

Analysis.—Calc. for $C_{10}H_{16}O_3NSP$ (mol. weight 261.3): N, 5.36%; P, 11.86%. Found: N, 5.77%; P, 11.78%.

The product possesses a mean toxicity of 250 mg. per kg. of animal, when administrated orally on the rat.

Mosquito larvae are completely destroyed by 0.001% solutions of the ester. The systemic action of 0.1% solution of the compound against aphids amounts to 100%.

*Example 5*

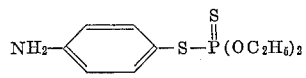

37.5 g. (0.25 mol) of 4-aminophenol thiocyanate and 46 g. (0.3 mol) of O,O-diethylthiolphosphorous acid ester are dissolved in 150 cc. of benzene. The amount of a solution of sodium methylate, corresponding to 0.28 mol of sodium, is added dropwise to this solution at 20° C. with cooling, and, after completion of the reaction, the mixture is washed with water until it reacts neutral. The organic phase is then dried over sodium sulphate. When the solvent has been distilled off, 61 g. (89.3% of the theoretical yield) of the O,O-diethyl-S-(4-aminophenyl-) thionothiolphosphoric acid ester remain in the form of a yellow, viscous oil which cannot be distilled.

Analysis.—Calc. for $C_{10}H_{16}O_2NS_2P$ (mol. weight 277.3): N, 5.05%; S, 23.12%; P, 11.17%. Found: N, 5.02%; S, 22.74%; P, 10.80%.

The compound possesses a mean toxicity of 50 mg. per kg. of animal when administered orally on the rat. Mosquito larvae are killed to 100% by 0.001% solution of the ester. The systemic action of 0.1% solution of the product against aphids is 100%.

Acetylation of the ester with the equivalent amount of acetic anhydride produces the acetyl derivative of M.P. 89° C. (from isopropyl alcohol) (mean toxicity ($LD_{50}$) administered orally to the rat 100 mg. per kg. of animal).

*Example 6*

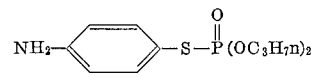

A solution of 37.5 g. (0.25 mol) of 4-aminophenyl thiocyanate and 55 g. (0.33 mol) of O,O-di-n-propylphosphorous acid ester in 150 cc. of benzene is treated dropwise at 20° C., with external cooling, with the amount of a solution of sodium methylate equivalent to 0.28 mol of sodium. The mixture is then allowed to complete its reaction at 20° C. for 15 minutes, and is then washed with water until the reaction is neutral. The benzene solution is finally dried over sodium sulphate, and the solvent is distilled off in vacuo. There remain 48 g. (66.6% of the theoretical yield) of the O,O-di-n-propyl-S-(4-aminophenyl-) thiolphosphoric acid ester in the form of a light brown, highly viscous oil, which gradually solidifies as crystals on cooling in ice water.

Analysis.—Calc. for $C_{12}H_{20}O_3NSP$ (mol. weight 289.3): N, 4.84%; S, 11.08%; P, 10.71%. Found N, 4.29%; S, 11.37%; P, 10.70%.

The mean toxicity of the compound ($LD_{50}$) amounts to 100 mg. per kg. of rat, administered orally.

*Example 7*

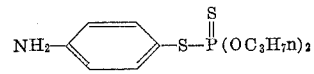

The amount of a solution of sodium methylate, corresponding to 0.28 mol of sodium, is added dropwise at a temperature of not more than 20° C., with external cooling, to a solution of 37.5 g. (0.25 mol) of 4-aminophenyl thiocyanate and 46 g. (0.3 mol) of O,O-di-n-propylthiolphosorous acid ester in 150 cc. of benzene. The mixture is subsequently stirred for another half hour, then treated with 250 cc. of water and washed with water until it reacts neutral. After drying of the benzene solution over sodium sulphate, the solvent is distilled off. The oily residue solidifies. It is stirred with petroleum ether. The O,O-di-n-propyl-S-(4-aminophenyl-) thionothiolphosphoric acid ester melts at 50 to 51° C. The yield amounts to 52 g. (68% of the theoretical).

Analysis.—Calc. for $C_{12}H_{20}O_2NS_2P$ (mol. weight 305.4): N, 4.59%; S, 20.99%; P, 10.14%. Found: N, 4.87%; S, 20.80%; P, 10.13%.

The compound possesses a mean toxicity of 500 mg. per kg. of animal, orally on the rat.

*Example 8*

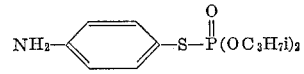

37.5 g. (0.25 mol) of 4-aminophenyl thiocyanate and 55 g. (0.33 mol) of O,O-diisopropylphosphorous acid ester are dissolved in 150 cc. of benzene. The amount of a solution of sodium methylate, corresponding to 0.28 mol of sodium, is added dropwise with cooling to this solution at not more than 20° C. After 15 minutes, the mixture is treated with 200 cc. of water, the organic phase is separated, and washed with water until its reaction is neutral. The solution is then dried over sodium sulphate, and the solvent distilled off in vacuo. The residual O,O-di-isopropyl-S-(4-aminophenyl-) thiolphosphoric acid ester is an orange coloured, highly viscous oil. The yield amounts to 45 g. (63.2% of the theoretical).

Analysis.—Calc. for $C_{12}H_{20}O_3NSP$ (mol weight 289.3): N, 4.84%; S, 11.03%; P, 10.71%. Found: N, 5.02%; S, 11.23%; P, 10.84%.

The mean toxicity (LD₅₀) of the compound administered orally on the rat, amounts to 250 mg. per kg. of animal.

*Example 9*

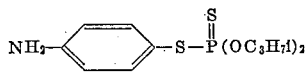

The amount of a solution of sodium methylate in methanol corresponding to 0.28 mol of sodium, is added dropwise at 20° C. with cooling to a solution of 37.5 g. (0.25 mol) of 4-aminophenyl thiocyanate and 46 g. (0.3 mol) of O,O-diisopropylthiophosphorous acid ester in 150 cc. of benzene, the mixture is then stirred for another half hour, then treated with 200 cc. of water, the organic phase is separated, and the latter washed with water until it has a neutral reaction. After the benzene solution has been dried over sodium sulphate and the solvent evaporated off, there remains 67 g. (88% of the theoretical yield) of the O,O-di-isopropyl-S-(4-aminophenyl-) thionothiolphosphoric acid ester in the form of a yellow viscous oil, which cannot be distilled.

*Analysis.*—Calc. for $C_{12}H_{20}O_2NS_2P$ (mol. weight 305.4): N, 4.59%; S, 20.99%; P, 10.14%. Found: N, 4.74%; S, 20.33%; P, 9.93%.

The compound possesses a mean toxicity of 500 mg. per kg. of animal, when administered orally on the rat.

*Example 10*

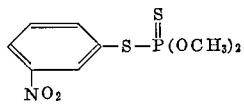

72 g. (0.4 mol) of 3-nitrophenyl thiocyanate (M.P. 50° C.) and 55 g. (0.44 mol) of O,O-dimethylthiolphosphorous acid ester are dissolved in 200 cc. of benzene, and 46 g. (0.44 mol) of 95% triethylamine are added dropwise to this solution at 25 to 30° C., with external cooling. The reaction proceeds strongly exothermally, particularly at the start. The reaction mixture is stirred for another half hour, whilst it slowly cools. The mixture is then washed with water, if necessary with a little dilute hydrochloric acid, until the washing water has a neutral reaction. The solution is finally dried over sodium sulphate, and the solvent is distilled off in vacuo. The residue which remains is recrystallised from methanol. This produces the O,O-dimethyl-S-(3-nitrophenyl-) thionothiolphosphoric acid ester in the form of heavy, pale yellow crystals with M.P. 102° C. The yield amounts to 92 g. (83.5% of theoretical).

*Analysis.*—Calc. for $C_8H_{10}O_4NS_2P$ (mol. weight 279.3): N, 5.02%; S, 22.96%; P, 11.09%. Found: N, 4.95%; S, 22.89%; P, 11.17%.

Caterpillars are completely killed by 0.1% solution, spider mites even by 0.01% solution of the ester.

*Example 11*

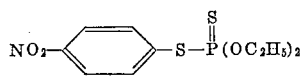

36 g. (0.2 mol) of 4-nitrophenyl thiocyanate (M.P. 133° C.) and 34 g. (0.22 mol) of O,O-diethylthiolphosphorous acid ester are dissolved or suspended in 150 cc. of absolute ethanol. 23 g. (0.22 mol) of 95% triethylamine are added dropwise to this solution at 25 to 30° C., the reaction mixture being occasionally cooled. The 4-nitrophenyl thiocyanate gradually disappears. The mixture is stirred for another 15 minutes, and then poured into about 300 cc. of water. The separated oil is taken up in benzene, the benzene solution is washed with water and with some dilute hydrochloric acid, and finally once more with water until its reaction is neutral. When the organic phase has been dried over sodium sulphate, the solvent is distilled off. The residue from distillation solidifies as crystals and is recrystallised from ether. The O,O-diethyl - S - (4-nitrophenyl-)- thionothiolphosphoric acid ester is obtained in the form of almost colourless coarse crystals of M.P. 49 to 50° C. The yield amounts to 49 g. (80% of the theoretical).

*Analysis.*—Calc. for $C_{10}H_{14}O_4NS_2P$ (mol. weight 307.3): N, 4.56%; S, 20.86%; P, 10.08%. Found: N, 4.51%; S, 21.12%; P, 10.11%.

The mean toxicity (LD₅₀) of the compound amounts to 10 mg. per kg. of animal, when administered orally on the rat.

Mosquito larvae are completely destroyed by 0.00001% solution, caterpillars by 0.1% solution of the compound.

*Example 12*

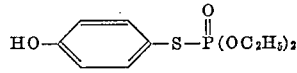

A solution of 37.5 g. (0.25 mol) of 4-hydroxyphenyl thiocyanate (M.P. 53° C.) and 46 g. (0.33 mol) of O,O-diethyl-phosphorous acid ester in 150 cc. of benzene is treated dropwise at 20° C., with external cooling, with the amount of a solution of sodium methylate, corresponding to 0.28 mol of sodium. The mixture is further stirred for a brief time until the reaction has subsided (about 30 minutes), 250 cc. of water are then added, the organic phase is separated and the latter washed with water until the washing water has a neutral reaction. The benzene solution is finally dried over sodium sulphate, and the solvent is distilled off in vacuo. There remains a yellow, very viscous oil which is not distillable. The yield of O,O-diethyl-S-(4-hydroxyphenyl-)thiolphosphoric acid ester amounts to 38 g. (57% of the theoretical).

*Analysis.*—Calc. for $C_{10}H_{15}O_4SP$ (mol. weight 262.3): S, 12.22%; P, 11.83%. Found: S, 13.01%; P, 11.82%.

The mean toxicity (LD₉₅) of the compound amounts to 500 mg. per kg. of animal, administered orally.

Mosquito larvae are killed to 100% by 0.001% solution of the ester.

*Example 13*

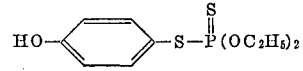

The amount of a solution of sodium methylate, corresponding to 0.33 mol of sodium, is added dropwise at 20° C., with external cooling, to a solution of 46 g. (0.3 mol) of 4-hydroxyphenyl thiocyanate (M.P. 53° C.) and 51 g. (0.33 mol) of O,O-diethylthiolphosphorous acid ester in 200 cc. of benzene. The mixture is subsequently stirred at room temperature for half an hour, then treated with water, the organic phase is separated and washed with water until it has a neutral reaction. When the benzene solution has been dried over sodium sulphate, the solvent is distilled off in vacuo. As residue, there remain 81.5 g. (97.6% of the theoretical yield) of the O,O-diethyl-S-(4-hydroxyphenyl-) thionothiolphosphoric acid ester in the form of a pale brown, viscous oil which is not distillable.

*Analysis.*—Calc. for $C_{10}H_{15}O_3S_2P$ (mol. weight 278.3): S, 23.04%; P, 11.13%. Found: S, 23.12%; P, 11.76%.

The mean toxicity of the compound, administered orally on the rat, amounts to 250 mg. per kg. of animal.

Flies are completely killed by 0.1% solution of the ester.

*Example 14*

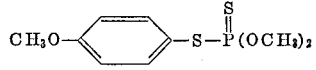

41 g. (0.25 mol) of 4-methoxyphenyl thiocyanate and 38 g. (0.3 mol) of O,O-dimethylthiolphosphorous acid ester are dissolved in 150 cc. of benzene. The amount of a solution of sodium methylate, corresponding to 0.28 mol of sodium, is added dropwise to this solution at 20° C.

with cooling. The reaction, which sets in, is strongly exothermal. The mixture is subsequently stirred at room temperature for another hour, then washed with water, the organic phase is dried over sodium sulphate, and the solvent is distilled off in vacuo. The residue from distillation passes over at 105° C. at a pressure of 0.01 mm. Hg in the form of a colourless oil. The yield of the O,O-dimethyl-S-(4-methoxyphenyl-)thionothiolphosphoric acid ester amounts to 53 g. (80.4% of the theoretical).

*Analysis.*—Calc. for $C_9H_{13}O_3S_2P$ (mol. weight 264.3): S, 24.37%; P, 11.73%. Found: S, 24.33%; P, 11.94%.

When 1000 mg. of the compound are administered per kg. of rat, the test animals admittedly exhibit symptoms of poisoning, but no cases of death occur.

Aphids and caterpillars are killed to 100% by 0.1% solution of the ester.

*Example 15*

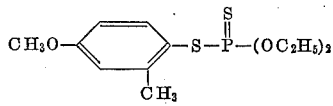

A solution of 45 g. (0.25 mol) of 2-methyl-4-methoxyphenylthiocyanate (B.P. 65° C./0.01 mm. Hg) and 46.5 g. (0.3 mol) of O,O-diethylthiolphosphorous acid ester in 150 cc. of benzene is treated dropwise at 20° C. with the amount of a solution of sodium methylate, corresponding to 0.28 mol of sodium, and stirred at room temperature for another hour. The mixture is washed with water until it has a neutral reaction, dried over sodium sulphate, and the solvent is distilled off. After slight forerunnings, the O,O - diethyl - S-(2-methyl-4-methoxyphenyl-)thionothiolphosphoric acid ester distills at 110° C. at a pressure of 0.01 mm. Hg as a colourless, viscous oil. Yield: 70 g. (91.6% of the theoretical amount).

*Analysis.*—Calc. for $C_{12}H_{19}O_3S_2P$ (mol. weight 306.4): C, 47.04%; H, 6.25%; S, 20.92%; P, 10.11%. Found: C, 47.37%, 47.13%; H, 6.40%, 6.30%; S, 20.74%; P, 9.84%.

The mean toxicity of the compound ($LD_{50}$), orally on the rat, amounts to 250 mg. per kg. of animal.

Flies are completely destroyed by 0.01% solution, caterpillars by 0.1% solution of the ester.

*Example 16*

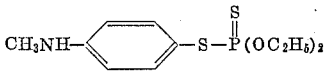

41 g. (0.25 mol) of 4-N-methylaminophenol thiocyanate and 46 g. (0.3 mol) of O,O-diethylthiolphosphorous acid ester are dissolved in 150 cc. of benzene, and the amount of a solution of sodium methylate, corresponding to 0.28 mol of sodium, is added dropwise to this solution at 20° C., with external cooling. The mixture is then stirred at room temperature for half an hour, washed with water until the reaction is neutral, the organic layer is dried over sodium sulphate, and the solvent is distilled off. The residual pale yellow, viscous oil is not distillable. The yield of O,O-diethyl-S-(4-N-methylaminophenyl-) thionothiolphosphoric acid ester amounts to 65 g. (94% of the theoretical).

*Analysis.*—Calc. for $C_{11}H_{18}O_3NSP$ (mol. weight 275.3): N, 5.09%; S, 11.65%; P, 11.25%. Found: N, 5.39%; S, 11.44%; P, 11.29%.

On oral administration of 1000 mg. of the compound per kg. of animal, rats only exhibit symptoms; no cases of death occur.

Mosquito larvae are killed to 50% by 0.0001% solution of the ester.

*Example 17*

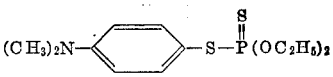

49 g. (0.25 mol) of 4-N,N-dimethylaminophenylthiocyanate (M.P. 73° C.) and 46 g. (0.3 mol) of O,O-diethylthiolphosphorous acid ester are dissolved in 150 cc. of benzene. The amount of a solution of sodium methylate corresponding to 0.28 mol of sodium, is added dropwise to this solution at 20° C. When the reaction mixture is subsequently worked up by the method described in the preceding examples, there are obtained 70 g. (91.8% of the theoretical yield) of the O,O-diethyl-S-(4-N,N-dimethylaminophenyl-) thionothiolphosphoric acid ester of B.P. 132° C./0.01 mm. Hg as an almost colourless oil.

*Analysis.*—Calc. for $C_{12}H_{20}O_2NS_2P$ (mol. weight 305.4): N, 4.59%; P, 10.15%; S, 20.99%. Found: N, 4.80%; P, 10.16%; S, 21.03%.

The main toxicity of the compound ($LD_{50}$), administered orally on the rat, amounts to 150 mg. per kg. of animal.

Aphids completely destroyed by 0.1% solution, mosquito larvae even by 0.001% solution of the ester.

*Example 18*

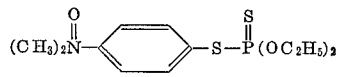

The amount of a solution of sodium methylate, corresponding to 0.28 mol of sodium is added dropwise at 20° C. with external cooling to a solution of 61 g. (0.25 mol) of 4-N-oxy-N,N-dimethylaminothiocyanate (M.P. 129 to 130° C. with decomp.) and 46 g. (0.3 mol) of O,O-diethylthiolphosphorous acid ester in 150 cc. of benzene. The mixture is subsequently stirred for half an hour, the precipitated salts are filtered off with suction, the residue is washed with benzene, and the solvent is distilled off from the filtrate. The residue is dissolved in water, the aqueous solution is neutralised by the addition of dilute hydrochloric acid (pH value 7), thereafter saturated with sodium sulphate, and the separated oil is extracted by shaking up with methylene chloride. The methylene chloride solution is dried over sodium sulphate. When the solvent has been distilled off, 41 g. (51% of the theoretical yield) of a pale yellow oil are obtained, which is insoluble in water and not distillable.

*Analysis.*—Calc. for $C_{12}H_{20}O_3NS_2P$ (mol. weight 321.4): N, 3.46%; S, 19.95%; P, 9.64%. Found: N, 3.81%; S, 20.10%; P, 9.88%.

The compound exhibits a mean toxicity of 50 mg. per kg. of animal, when administered orally on the rat.

Mosquito larvae are completely killed by 0.001% solution of the ester.

*Example 19*

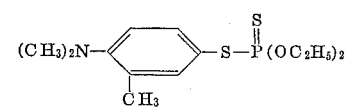

47. g. (0.25 mol) of 3-methyl-4-N-N-dimethylaminophenyl thiocyanate (B.P. 76° C./0.01 mm. Hg) and 46 g. (0.3 mol) of O,O-diethylthiolphosphorous acid ester are dissolved in 150 cc. of benzene. The amount of a solution of sodium methylate, corresponding to 0.28 mol of sodium, is added dropwise to this solution at 20° C. with cooling. The mixture is subsequently stirred for another 15 minutes, then treated with water, and worked up as described in the preceding examples. When the solvent has been distilled off, the O,O-diethyl-S-(3-methyl - 4 - N,N - dimethylaminophenyl-)thionothiolphosphoric acid ester is obtained in the form of a colourless, viscous oil, which boils at 117° C. at a pressure of 0.01 mm. Hg. Yield: 62 g. (77.7% of the theoretical).

*Analysis.*—Calc. for $C_{13}H_{22}O_2NS_2P$ (mol. weight 319.4): N, 4.39%; S, 20.08%; P, 9.70%. Found: N, 4.55%; S, 20.48%; P, 9.84%.

The mean toxicity of the compound ($LD_{50}$) administered orally on the rat, amounts to 50 mg. per kg. of animal.

Larvae of flies are killed at 70% by 0.01% solution of the ester.

By an analogous method the following compounds are obtained:

| Constitution | Toxicity towards warm-blooded animals, orally on rats, mg./kg. ($LD_{50;95}$) | Physical properties (B.P., M.P.) | Yield (Percent of the theoretical) |
|---|---|---|---|
| H,CH₃-N-C₆H₄-S-P(=O)(OCH₃)₂ | $LD_5$ 500 | Oil | 81 |
| H,CH₃-N-C₆H₄-S-P(=O)(OC₂H₅)₂ | $LD_{50}$ 100 | Oil | 78.7 |
| (CH₃)₂N-C₆H₄-S-P(=O)(OCH₃)₂ | $LD_{95}$ 500 | M.P. 45 to 46° C | 83.8 |
| (CH₃)₂N-C₆H₄-S-P(=O)(OC₂H₅)₂ | $LD_{95}$ 100 | B.P. 0.01 123° C | 18 |
| (CH₃)₂N-C₆H₄-S-P(=O)(OC₃H₇i)₂ | $LD_{50}$ 150 | M.P. 87° C | 87.2 |
| (CH₃)₂N-C₆H₄-S-P(=S)(OC₃H₇i)₂ | 1,000 without symptoms. | M.P 53° C | 55.3 |
| (CH₃)₂N-C₆H₄-S-P(=O)(OC₃H₇n)₂ | $LD_{95}$ 100 | | 90.3 |
| (CH₃)₂N-C₆H₄-S-P(=S)(OC₃H₇n)₂ | $LD_{50}$ 250 | B.P. 0.01/127° C | 90.2 |
| H,H-N-C₆H₄-S-P(=S)(OC₂H₅)₂ (meta) | 50 symptoms | Oil | 77 |
| NH₂SO₂, NH₂-C₆H₃-S-P(=S)(OC₂H₅) | $LD_{50}$ 100 | M.P. 129° C | 62 |
| H,H-N-C₆H₃(CH₃)-S-P(=O)(OCH₃)₂ | $LD_{50}$ >1,000 | | 59.4 |
| H,CH₃CO-N-C₆H₃(CH₃)-S-P(=O)(OCH₃)₂ | $LD_{50}$ 500 | M.P. 133 to 134° C | 44.3 |
| H,H-N-C₆H₃(CH₃)-S-P(=O)(OC₂H₅)₂ | $LD_{95}$ 250 | | 65.5 |
| H,CH₃CO-N-C₆H₃(CH₃)-S-P(=O)(OC₂H₅)₂ | $LD_{95}$ 50 | | 47.8 |

| Constitution | Toxicity towards warm-blooded animals, orally on rats, mg./kg. (LD$_{50.95}$) | Physical properties (B.P., M.P.) | Yield (Percent of the theoretical) |
|---|---|---|---|
| H₂N—⟨C₆H₃(CH₃)⟩—S—P(S)(OC₂H₅)₂ | LD$_{50}$ 100 | | 61.6 |
| CH₃CO-NH—⟨C₆H₄⟩—S—P(S)(OC₂H₅)₂ | LD$_{50}$ 25 | M.P. 69° C | 79.5 |
| CH₃CO-NH—⟨C₆H₃(CH₃)⟩—S—P(O)(OC₂H₅)₂ | LD$_{95}$ 250 | | 81.2 |
| CH₃CO-NH—⟨C₆H₃(CH₃)⟩—S—P(S)(OC₂H₅)₂ | LD$_{50}$ 100 | M.P. 61° C | 88.4 |

*Example 20*

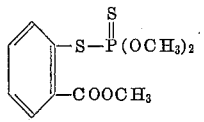

77 g. (0.4 mol) of 2-methoxycarbonylphenyl thiocyanate (prepared in accordance with "Liebigs Ann.," vol. 341, page 400; M.P. 76 to 77° C.) and 55 g. (0.44 mol) of O,O-dimethylthiolphosphorous acid ester are suspended or dissolved in 200 cc. of methanol. 46 g. (0.46 mol) of 95% triethylamine are added dropwise to this mixture at 20 to 25° C. with external cooling, the reaction mixture is stirred at 30 to 35° C. for another half hour, then cooled and poured into 250 cc. of water. The separated crystal mass is filtered off with suction and dried in air. The O,O-dimethyl-S-(2-methoxycarbonylphenyl-)thionothiolphosphoric acid ester crystallises from cyclohexane as coarse, pale yellow needles with M.P. 67° C. The yield amounts to 69 g. (59% of the theoretical).

*Analysis.*—Calc. for C₁₀H₁₃O₄S₂P (mol. weight 292.3): S, 21.44%; P, 10.60%. Found: S, 21.69%; P, 10.76%.

Aphids are killed to 50% and caterpillars to 80% by 0.01% solution of the ester.

*Example 21*

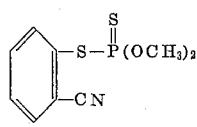

28 g. (0.175 mol) of 2-cyanophenyl thiocyanate (M.P. 83° C., prepared in accordance with "Berichte der deutschen chem. Gesellschaft," vol. 59, page 1077 [1926]) and 24.3 g. (0.19 mol) of O,O-dimethylthiolphosphorous acid ester are dissolved in 150 cc. of benzene, and 21 g. (0.2 mol) of 95% triethylamine are added dropwise to the solution at 20 to 25° C. with cooling. The reaction which takes place proceeds first exothermally. The mixture is stirred for half an hour and then treated with water, the organic layer is separated and washed with water containing a few drops of hydrochloric acid, until the reaction is neutral. The solution is finally dried over sodium sulphate, and the benzene distilled off in vacuo. The residue from distillation is triturated with petroleum ether and filtered off with suction. On recrystallisation from an ether/petroleum ether mixture, the O,O-dimethyl-S-(2-cyanophenyl) thionothiolphosphoric acid ester is obtained in the form of beige coloured coarse crystals of M.P. 74° C. The yield amounts to 21 g. (46.3% of the theoretical).

*Analysis.*—Calc. for C₉H₁₀O₂NS₂O (mol. weight 259.3): N, 5.40%; P, 11.95%; S, 24.73%. Found: N, 5.49%; P, 12.04%; S, 24.71%.

Flies and aphids are completely destroyed by 0.001% solution of the compound.

*Example 22*

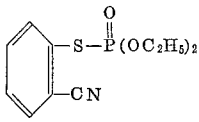

46 g. (0.46 mol) of triethylamine are added dropwise at 20 to 25° C., with cooling, to a solution of 64 g. (0.4 mol) of 2-cyanophenyl thiocyanate (M.P. 83° C.) and 62 g. (0.44 mol) of O,O-diethylphosphorous acid ester in 340 cc. of benzene, this mixture is subsequently stirred at room temperature for another 30 minutes, and then washed with water containing a little diluted hydrochloric acid, until the reaction is neutral. The benzene solution is then dried over sodium sulphate, and the solvent distilled off in vacuo. The residue from distillation solidifies, is triturated with petroleum ether and filtered off with suction. On recrystallisation from petroleum ether with the addition of a little ether, the O,O-diethyl-S-(2-cyanophenyl-) thiolphosphoric acid ester is obtained in the form of pale yellow, coarse crystals of M.P. 44° C. The yield amounts to 80 g. (74.2% of the theoretical).

*Analysis.*—Calc. for C₁₁H₁₄O₃NSP (mol. weight 271.3): N, 5.16%; P, 11.42%; S, 11.82%. Found: N, 5.31%; P, 11.74%; S, 11.78%.

Aphids are killed to 100% and spider mites to 60% by 0.001% solutions of the ester. Moreover the compound possesses an ovicidal activity against the eggs of spider mites.

*Example 23*

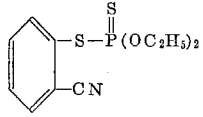

64 g. (0.4 mol) of 2-cyanophenyl thiocyanate (M.P. 83° C.) and 69 g. (0.44 mol) of O,O-diethylthiolphosphorous acid ester are dissolved in 340 cc. of benzene. 46 g. (0.46 mol) of 95% triethylamine are added dropwise to this solution, a strongly exothermal reaction setting in. The mixture is strongly cooled with ice water so that an internal temperature of 20 to 25° C. is attained, subsequently further stirred at room temperature for a half hours, and worked up as described in the preceding examples. The resultant O,O-diethyl-S-(2-cyano-phenyl-)thionothiolphosphoric acid ester is recrystallised from petroleum ether with the addition of a little ether, and there are obtained brownish, coarse crystals of M.P. 62° C. The yield amounts to 83 g. (72% of the theoretical).

Analysis.—Calc. for $C_{11}H_{14}O_2NS_2P$ (mol. weight 287.4): N, 4.87%; S, 22.31%; P, 10.78%. Found: N, 4.93%; S, 22.18%; P, 10.67%.

Aphids are killed to 60% by 0.0001% solutions and mosquito larvae are destroyed to 80% even by 0.00001% solutions of the compound.

Example 24

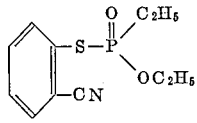

A solution of 64 g. (0.4 mol) of 2-cyanophenyl thiocyanate (M.P. 83° C.) and 54 g. (0.44 mol) of ethylphosphonous acid-O-ethyl ester (B.P. 41 to 43° C./2 mm. Hg) in 340 cc. of benzene is treated at 20° C., without external cooling, in the course of 20 minutes with 46 g. (0.46 mol) of 95% triethylamine. During this procedure, the temperature of the mixture rises to about 35° C. after one hour, and then again decreases slowly. To complete the reaction, the reaction mixture is stirred for another 2 hours, then poured into 500 cc. of water, the organic layer is separated, and the latter washed with water until neutral. After the benzene solution has been dried over sodium sulphate, the solvent is distilled off in vacuo. The residue from distillation goes over, after slight first runnings, at 122° C. at a pressure of 0.05 mm. Hg as a yellow water-insoluble oil; the ethylthiolphosphonic acid-O-ethyl-S-(2-cyanophenyl-) ester has a rerfractive index of $n_D^{22}=1.5599$. The yield amounts to 50 g. (46% of the theoretical).

Aphids are completely destroyed by 0.01% solutions, caterpillars even by 0.001% solution of the ester.

Example 25

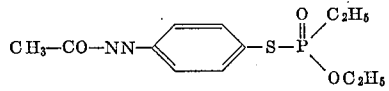

48 g. (0.25 mol) of 4-acetamidophenyl thiocyanate (M.P. 188° C.) and 40 g. (0.33 mol) of ethylphosphonous acid-O-ethyl ester are dissolved in 150 cc. of benzene. The amount of a solution of sodium methylate corresponding to 0.28 mol of sodium, is added dropwise to this solution at 10 to 20° C. with external cooling, the reaction mixture is stirred at room temperature for another 30 minutes and then poured into 250 cc. of water. The separated oil is dissolved completely in the benzene layer with the aid of a little methylene chloride, and the organic phase is subsequently washed with water until the reaction is neutral. When the benzene-methylene chloride solution has been dried over sodium sulphate and the solvents have been distilled off in vacuo, there remain 55 g. (76.7% of the theoretical yield) of the ethylthiolphosphonic acid - O - ethyl-S-(4-acetamidophenyl-) ester in the form of a highly viscous yellow oil, which does not crystallise and cannot be distilled.

Analysis.—Calc. for $C_{12}H_{18}O_3NSP$ (mol. weight 287.3): N, 4.88%; S, 11.16%; P, 10.78%. Found: N, 5.04%; S, 11.04%; P, 10.88%.

The mean toxicity of the compound, administered orally on the rat, amounts to 2 mg. per kg. of animal.

Spider mites are completely killed by 0.1% solutions of the ester. The systemic action of 0.1% solutions of the compound against aphids amounts to 100%.

Example 26

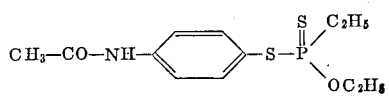

48 g. (0.25 mol) of 4-acetamidophenyl thiocyanate (M.P. 188° C. and 42 g. (0.3 mol) of ethylthionophosphonous acid-O-ethyl ester are dissolved or suspended in 150 cc. of benzene. The amount of a solution of sodium methylate, corresponding to 0.28 mol of sodium, is added dropwise to this mixture at 10 to 15° C., with cooling, the reaction mixture is stirred at 20° C. for another half an hour, and then treated with 250 cc. of water. After the addition of a little methylene chloride, the organic phase is separated, washed with water until its reaction is neutral, subsequently dried over sodium sulphate, and the solvent is finally distilled off. The ethylthionothiolphosphonic acid-O-ethyl-S-(4-acetamidophenyl-)ester remains in crystalline form. The product is triturated with petroleum ether, and then again filtered off with suction. The product has a melting point of 98° C. The yield amounts to 69 g. (90.5% of the theoretical).

Example 27

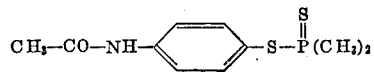

48 g. (0.25 mol) of 4-acetamidophenyl thiocyanate (M.P. 188° C.) and 31 g. (0.3 mol) of dimethylthiophosphinous acid (B.P. 70° C./2 mm. Hg) are dissolved or suspended in 150 cc. of benzene, and the amount of a solution of sodium methylate corresponding to 0.28 mol of sodium is added dropwise to this mixture at 10 to 20° C., with external cooling. The reaction sets in instantaneously and the reaction product crystallises out. The reaction mixture is stirred for another 10 minutes, the precipitate formed is filtered off with suction and washed with water. By recrystallisation from methanol, the dimethylthionothiolphosphinic acid - (4 - acetamidophenyl-) ester is obtained pure in the form of colourless needles of M.P. 187° C. The yield amounts to 62 g. (98.3% of the theoretical).

Example 28

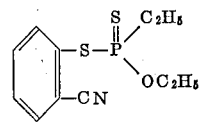

21.7 g. (0.204 mol) of 95% triethylamine are added dropwise at 20 to 25° C., with external cooling to a solution of 30 g. (0.188 mol) of 2-cyanophenylthiocyanate and 28.5 g. (0.206 mol) of ethylthiophosphonous acid-O-ethyl ester in 170 cc. of benzene. After the exothermic reaction has subsided the separated small quantities of contaminants are filtered off with suction. The filtrate is poured into water, the organic layer is washed first with water, later on with little diluted hydrochloric acid and finally again with water until its reaction is neutral. After drying the benzene solution over sodium sulphate the solvent is distilled off. The remaining ethylthionothiolphosphonic acid-O-ethyl-S-(2-cyanophenyl)-ester distils over after slight first runnings at a pressure of 0.01 mm. Hg at 115° C. in the form of an orange red oil. The yield amounts to 35 g. (68.7% of the theoretical).

Spider mites are killed to 90% by 0.001% solution and caterpillars are completely destroyed by 0.01% solution of the compound. Moreover the ester exhibits an ovicidal activity against the eggs of spider mites.

I claim:
1. A compound of the formula

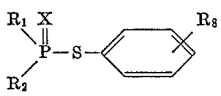

wherein $R_1$ and $R_2$ stand for members selected from the group consisting of lower alkyl having up to 4 carbon atoms and lower alkoxy having up to 4 carbon atoms and in which $R_8$ stands for a member selected from the group consisting of lower alkoxy carbonyl, said lower alkoxy having up to 4 carbon atoms and cyano and in which X stands for a member selected from the group consisting of oxygen and sulfur.

2. A compound of the formula

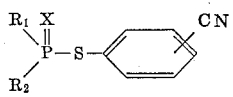

wherein $R_1$ and $R_2$ stand for members selected from the group consisting of lower alkyl having up to 4 carbon atoms and lower alkoxy having up to 4 carbon atoms and in which X stands for a member selected from the group consisting of oxygen and sulfur.

3. A compound of the following formula

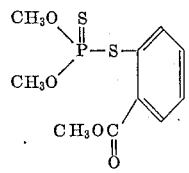

4. A compound of the following formula

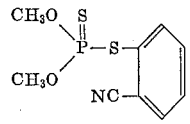

5. A compound of the following formula

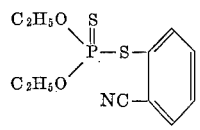

6. A compound of the following formula

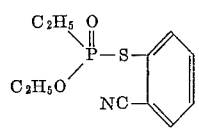

References Cited by the Examiner

UNITED STATES PATENTS

| | | | |
|---|---|---|---|
| 2,597,534 | 5/1952 | Schrader | 260—461 |
| 2,640,847 | 6/1953 | Schrader | 260—461 |
| 2,690,450 | 9/1954 | Gilbert et al. | 260—461 |
| 2,861,876 | 11/1958 | Birum | 260—461 |
| 2,967,884 | 1/1961 | Dunn et al. | 260—461 |
| 3,056,825 | 10/1962 | Schegk et al. | 260—461 |
| 3,082,240 | 3/1963 | Lorenz et al. | 260—461 |
| 3,150,040 | 9/1964 | Kuramoto et al. | 260—461 |

FOREIGN PATENTS 1,087,591   8/1960   Germany.

OTHER REFERENCES

Metcalf, "Organic Insecticides," Interscience Publishers Inc. (1955), p. 292.

CHARLES B. PARKER, *Primary Examiner.*

IRVING MARCUS, *Examiner.*